April 11, 1967     J. R. COLE     3,313,370
ELECTROMAGNETIC SEISMIC TRANSDUCER SYSTEM
Filed March 18, 1964     2 Sheets-Sheet 1
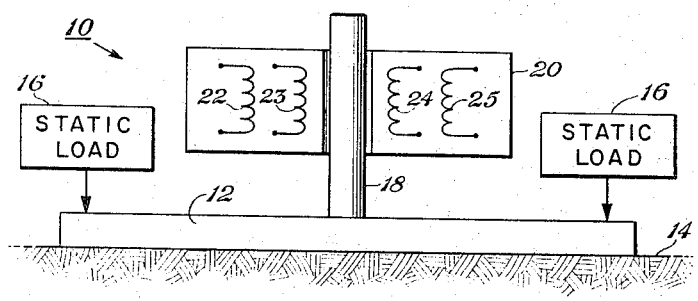
Fig. 1
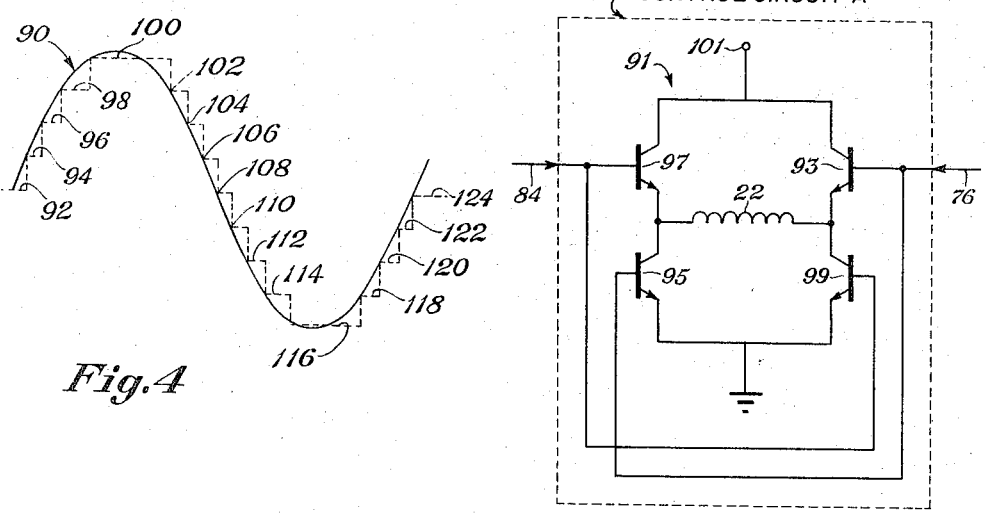
Fig. 4
Fig. 3
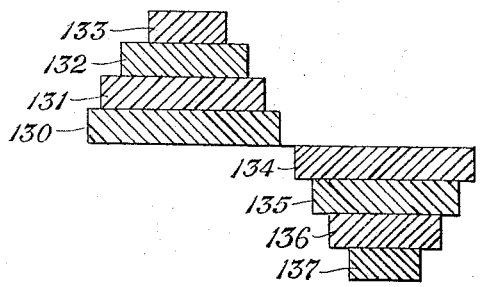
Fig. 5
INVENTOR.
Jimmy R. Cole
BY William J. Miller
Attorney April 11, 1967  J. R. COLE  3,313,370
ELECTROMAGNETIC SEISMIC TRANSDUCER SYSTEM
Filed March 18, 1964  2 Sheets-Sheet 2

INVENTOR.
Jimmy R. Cole
BY
William J. Miller
Attorney

United States Patent Office 3,313,370
Patented Apr. 11, 1967

3,313,370
ELECTROMAGNETIC SEISMIC TRANSDUCER
SYSTEM
Jimmy R. Cole, Ponca City, Okla., assignor to Continental Oil Company, Ponca City, Okla., a corporation of Delaware
Filed Mar. 18, 1964, Ser. No. 352,796
4 Claims. (Cl. 181—.5)

The present invention relates to seismic transducers, and more particularly, but not by way of limitation, relates to an improved electromagnetic transducer and to an improved electrical control circuit to drive the transducer in such a manner as to efficiently generate a seismic sweep signal closely approximating a sine wave having substantially any continuously varying or stable frequency.

In one system of seismographic surveying, a seismic sweep signal uniformly varying in frequency bewteen about 10 c.p.s. to about 80 c.p.s. is induced in the earth and the seismic reflections from subsurface interfaces recorded. Due to the fact that the sweep signal induced in the earth may have a time duration of several seconds, the seismic reflections overlap and the recorded signal is highly complex and of little value in its raw form. However, by correlating the original sweep signal against the recorded reflections, valuable data can be obtained concerning the depth and location of the subsurface interfaces. But before this correlation can be successfully carried out, the seismic signal actually induced in the earth must closely represent the seismic sweep signal desired and be precisely in phase with the sweep signal, and must be substantially free of any undesirable harmonic frequencies.

One type of seismic transducer which has been used to generate seismic signals comprising a baseplate which is pressed against the surface of the earth with a static load, a reaction mass and an electromagnetic drive for reciprocating the reaction mass relative to the baseplate. Reciprocation of the reaction mass produces an equal and opposite reaction force which also reciprocates the base plate. Such a system is clearly described and explained in Patent No. Re. 25,401 dated June 18, 1963, based on original Patent No. 3,024,861 dated Mar. 13, 1962, by Frank Clynch and assigned to the same assignee as this application.

In order to economically obtain the necessary power to drive the coil of the transducer, it has heretofore been found necessary to employ either a transistor or an SCR controlled bridge inverter which is switched in synchronism with the sine wave sweep signal to produce a square wave having a synchronized frequency. The bridge inverter is highly efficient and can have a high power rating because the transistors, or the SCR's, used in the bridge absorb very little power during the almost instant switching from "off" to "on" to "off" in the operation of the bridge inverter. However, the square wave signal makes it impossible to reproduce the desired sine wave form of the sweep signal with any degree of fidelity due to the inherent harmonic frequencies of the square wave, and these harmonic frequencies materially interfere with the correlation and other processing techniques of the recorded reflection signals.

The present invention contemplates a seismic transducer having an electromagnetic drive system which has all the advantages of an inverter bridge, yet which will approximate a sine wave of substantially any frequency, or any continuously changing frequency so as to materially reduce the harmonic frequencies inherent in the square wave normally produced by a bridge type inverter. Without intending to limit the invention at this time, the invention may be summarily described as comprising a clock circuit for producing a series of pulses. A voltage comparator and threshold circuit compares the voltage of the control signal which is to be reproduced with a feedback voltage. If the control signal voltage exceeds the feedback voltage by a predetermined threshold value, the comparator and threshold circuit passes the pulses from the clock circuit through a positive output and if the control signal voltage is less than the feedback voltage by the threshold value, the clock pulses are passed through a negative output. The positive and negative outputs are connected to a logic circuit which counts the pulses passed through the positive output and increases the feedback voltage a predetermined amount for each positive pulse and decreases the feedback voltage the same amount for each negative signal counted. The feedback voltage then approximates the control signal wave shape by a series of steps. The feedback voltage is then reproduced as seismic energy by some suitable means.

In accordance with an important aspect of the invention, the feedback voltage is transformed into seismic energy by a plurality of electromagnetic coils disposed to reciprocate a reaction mass relative to a baseplate which can be pressed against the ground. D.C. power is switched to successive coils at each step of the feedback voltage so that the total electromagnetic force curve corresponds to the stepped wave shape feedback voltage and therefore closely approximates the control signal in frequency, wave shape and phase. In accordance with another aspect of the invention, a single coil may be used and the voltage applied to the coil increased in steps in correspondence with the feedback voltage signal.

Therefore, an important object of this invention is to provide an improved electromagnetic seismic transducer and drive system which will generate a seismic signal approximating a sine wave and therefore having significantly reduced harmonic distortion.

Another object of the present invention is to provide a system of the type described which nevertheless utilizes the advantages of D.C. to A.C. square wave inverters, such as a bridge inverter.

Yet another object of the present invention is to provide a system of the type described which will start to operate immediately upon receipt of a control signal and cease to operate when the control signal is discontinued, Still another object of the present invention is to provide a system of the type described which will approximately reproduce a control signal having substantially any frequency and wave shape, or having a continuously changing frequency.

A still further object of the invention is to provide a control circuit system which may be utilized to convert substantially any control wave form, of substantially any stable or changing frequency to a stepped wave form approximating the control wave form which can be used to any desired control function such as the reproduction of various types of energy having approximately the same wave form as the control signal.

Many additional objects and advantages will be evident to those skilled in the art from the following detailed description and drawings, wherein:

FIGURE 1 is a schematic representation of a seismic transducer constructed in accordance with the present invention;

FIGURE 3 is a schematic circuit diagram of a typical bridge inverter used in the circuit diagram of FIGURE 2;

FIGURE 4 is an amplitude and time plot which serves to illustrate the operation of the system of FIGURE 2; and, FIGURE 5 is another amplitude and time plot which serves to further illustrate the operation of the system of FIGURE 2.

Figure 2:
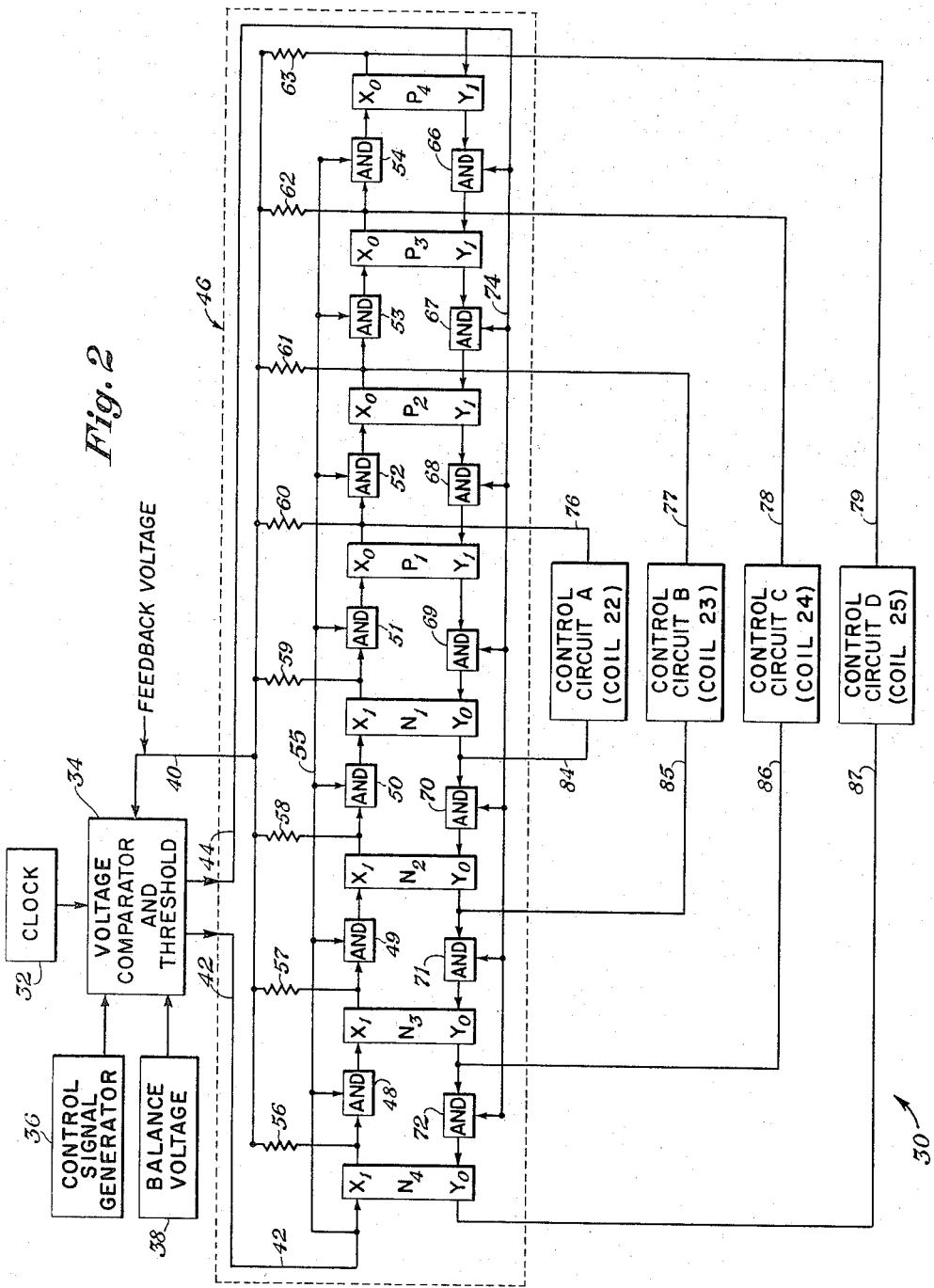
FIGURE 2 is a schematic circuit diagram of a system constructed in accordance with the present invention.

Referring now to the drawings, and in particular to FIGURE 1, a seismic transducer constructed in accordance with the present invention is indicated generally by the reference numeral 10. The transducer 10 comprises a baseplate 12 which may be coupled to the surface of the earth 14 by a suitable static load represented at 16. The static load may be applied through any suitable conventional isolation device which will permit vertical reciprocation of the baseplate 12. A reaction mass 20 is coupled to the baseplate 12 by an electromagnetic drive comprised of an armature 18 extending through the reaction mass 20 and four electromagnetic coils 22, 23, 24 and 25 which are connected to the reaction mass. Of course the armature could be connected to the reaction mass and the coils connected to the baseplate if desired. When the coils 22–25 are energized in the sequence presently to be described, the reaction mass 20 is reciprocated along the vertically disposed armature 18 and is therefore reciprocated relative to the baseplate 12. The force of reaction resulting from reciprocation of the reaction mass 20 reciprocates the baseplate 12 and thereby moves the surface of the earth 14 in such a manner as to induce a seismic wave in the earth having a wave shape corresponding essentially to the wave shape of the electromagnetic force generated.

Referring now to FIGURE 2, a system for controlling the energization of the electromagnetic coils 22–25 is indicated generally by the reference numeral 30. The system comprises a conventional clock circuit means 32 for producing a series of pulses at predetermined time intervals. The clock pulses are fed to a voltage comparator and threshold circuit 34 of any suitable conventional design. A control signal voltage from a signal generator 36, a balance voltage from a suitable manual variable source 38 and a feedback signal voltage from the logic circuit presently to be described are also fed into the voltage comparator and threshold circuit 34, the latter being applied through line 40. The voltage comparator and threshold circuit 34 has a positive output 42 and a negative output 44.

The function of the voltage comparator and threshold circuit is to pass the clock pulses from the clock 32 either through the positive output 42 or negative output 44, depending upon the total value of the control signal voltage and the balance voltage as compared to the value of the feedback voltage. If the total voltage of the control signal and the balance voltage is equal to the feedback voltage, within predetermined threshold value limits, no clock pulses are transmitted to either the positive or negative outputs. However, if the total value of the control signal voltage and the balance voltage exceeds the value of the feedback voltage by the predetermined threshold value, the clock pulses are passed through to the positive output 42. On the other hand, if the total value of the control signal voltage and balance voltage is less than the feedback voltage by the threshold value, the clock pulses are passed through to the negative output 44. The positive and negative outputs 42 and 44 and the feedback voltage line 40 are connected to a logic circuit indicated generally by the reference numeral 46.

The logic circuit 46 is comprised of four binary or flip-flop circuits designated $P_1$, $P_2$, $P_3$ and $P_4$, which for convenience are designated with the P reference character because they control the positive-going portion of the ultimate output signal as will presently be described, and four binary circuits designated $N_1$, $N_2$, $N_3$ and $N_4$ which control the negative-going portion of the ultimate output signal. Each of the eight binary circuits may be of any suitable conventional design having a pair of input terminals X and Y and a corresponding pair of output terminals represented by the same character designations. If the X output is positive, the Y output is zero. Then when the binary is switched, the X output goes to zero and the Y output goes positive. The binary can be switched only by a positive pulse applied to the input terminal corresponding to the terminal which is in the zero state. For example, if the X output terminal of binary $P_1$ is zero and the Y output terminal is positive, a positive pulse applied to the X input terminal will switch the binary such that the X output will become positive and the Y output will become zero. Subsequent positive pulses applied to the X input terminal will not switch the binary because the X output terminal is already positive. However, a positive pulse applied to the Y input terminal will switch the binary such that the Y output terminal, which was zero, will become positive and the X output terminal will be switched to zero voltage. As illustrated in FIGURE 2, the logic circuit 46 is represented in the passive state so that no final output signal results, as will presently be described. In the passive state the X output terminals of the P binaries are at zero voltage and the X output terminals are accordingly designated with an $X_0$. Conversely, since the Y output terminals of the P binaries are positive, the Y output terminals are designated as $Y_1$. On the other hand, the X output terminals of the N binaries are positive and are designated as $X_1$, while the Y output terminals are zero and are therefore designated $Y_0$.

The positive output 42 of the voltage comparator and threshold circuit 34 is connected to the X input terminal of binary $N_4$ and to one of two inputs of each of the AND gates 48 through 54 by line 55. The X output terminal of binary $N_4$ is connected to the other input terminal of the AND gate 48. The output from the AND gate 48 is connected to the X input terminal of the binary $N_3$. In similar fashion, the X output terminals from the binaries $N_3$, $N_2$, $N_1$, $P_1$, $P_2$ and $P_3$ are connected to the other inputs of the AND gates 49–54, respectively, and the outputs from the respective AND gates 49–54 are connected to the X input terminals of the binaries $N_2$, $N_1$, $P_1$, $P_2$, $P_3$ and $P_4$, respectively. The respective X output terminals of the eight binaries $N_4$–$N_1$ and $P_1$–$P_4$ are connected through resistors 56–63, respectively, to the feedback voltage line 40.

The negative output 44 of the voltage comparator and threshold circuit is connected to the Y input terminal of binary $P_4$ and to one input terminal of each of the AND gates 66 through 72 by the line 74. The Y output terminals of the binaries $P_4$, $P_3$, $P_2$, $P_1$, $N_1$, $N_2$ and $N_3$ are connected to the other input terminals of the AND gates 66–72, respectively, and the outputs of the respective AND gates 66–72 are connected to the Y input terminals of the binaries $P_3$, $P_2$, $P_1$, $N_1$, $N_2$, $N_3$ and $N_4$, respectively.

The X output terminal of binary $P_1$ is connected to the positive control terminal of control circuit A by the lead 76. Similarly, the X output terminals of binaries $P_2$, $P_3$ and $P_4$ are connected to the positive control terminals of the control circuits B, C and D by leads 77, 78 and 79, respectively. On the other hand, the Y output terminals of binaries $N_1$, $N_2$, $N_3$ and $N_4$ are connected to the negative control terminals of the control circuits A–D, by leads 84, 85, 86 and 87, respectively. The control circuits A–D are used to control current to the electromagnetic coils 22, 23, 24 and 25, respectively, and may be of any suitable design capable of switching current to the respective coil in response to a signal from the logic circuit.

For example, as illustrated in FIGURE 3, control circuit A may conveniently comprise an inverter bridge, indicated generally by the reference numeral 91, comprised of four transistors 93, 95, 97 and 99 connected to the ends of the coil 22 and across a source of D.C. power having a positive terminal 101 substantially as illustrated. The lead 76 is connected to the bases of the transistors 93 and 95 such that a positive pulse from the logic circuit will turn the transistors "on" and current will flow from right to left through the electromagnetic coil 22. On the other hand, a positive pulse through lead 84, which is connected to the bases of the transistors 97 and 99 will turn the respective transistors "on" and cause current to flow from left to right through the coil 22. The leads 76 and 84 are, of course, never made positive at the same time. Further, it will be evident that when neither of the leads 76 or 84 is positive, no current will pass through the coil 22 in either direction. Each of the control circuits B, C and D for the coils 23, 24 and 25 may be substantially identical to control circuit A. However, it is also to be understood that a control circuit utilizing SCR's such as that described in U.S. Patent No. 3,103,616 may be used in place of the transistorized inverter bridge circuit 91 to control the current to each of the electromagnetic coils and still be within the more specific aspects of the present invention.

*Operation*

In order to adjust the circuit 30 for operation, the balance voltage from the source 38 is adjusted to a value equal to the total value of the feedback voltage produced when X output terminals of the negative binaries $N_1$, $N_2$, $N_3$ and $N_4$ are positive. Then the logic circuit will, in the absence of a control signal voltage, assume the passive state illustrated with the X output terminals of the negative binaries $N_1$–$N_4$ at a positive value, i.e., in the "on" state, and the X terminals of the positive binaries $P_1$–$P_4$ in the zero voltage state so that no feedback voltage is applied through the resistors 60–63. When the logic circuit is in the passive state, it will also be noted that zero voltage is applied through the leads 76–79 to the positive terminals of control circuits A–D because the X outputs of the P binaries are at zero state. Similarly, no voltage is applied to the negative terminals of the respective control circuits because the Y output terminals of the negative binaries $N_1$–$N_4$ are also at zero state. Therefore, no current flows through any of the coils 22, 23, 24 or 25. Further, since the balance voltage equals the feedback voltage, the pulses from the clock circuit 32 do not pass through the voltage comparator and threshold circuit 34. voltage, when for the passive state of the system is represented by the curve 90 in FIGURE 4 is applied to the voltage comparator and threshold circuit 34 by the control signal generator 36. As the voltage of the control signal rises, no pulses from the clock circuit 32 will be passed until the control signal voltage exceeds the feedback signal voltage by a predetermined threshold value. When the control signal does exceed the feedback signal voltage, which for the passive state of the system is represented by the zero amplitude line 92 in FIGURE 4, the next clock pulse is passed through the positive output 42 to the logic circuit 46. Since the X output terminals of the negative binaries $N_4$, $N_3$, $N_2$ and $N_1$ are already in the positive state, these binaries are not switched. Since the positive output of the X output terminal of binary $N_1$ is applied to one of the input terminals of AND gate 51 when the positive clock pulse from the output 42 arrives through the lead 55 at the other input terminal of AND gate 51, the clock pulse will pass through AND gate 51 to the X input terminal of binary $P_1$ and the binary is switched such that the X output terminal goes positive. But since the X output terminals of binaries $P_1$, $P_2$ and $P_3$ are zero, and therefore one input of each of the AND gates 52, 53 and 54 is zero, the clock pulses cannot pass through the AND gates 52, 53 and 54 to switch binaries $P_2$, $P_3$ and $P_4$. It will be noted that a suitable delay should be incorporated either in the output of each of the binaries or in the input of the AND gates so that the positive output from the respective binaries will not be applied to the respective AND gates until after the clock pulse has subsided. Otherwise, each pulse might switch more than one binary.

The positive output from the X terminal of binary $P_1$ is fed back through resistor 60 to the feedback voltage lead 40 such that the feedback signal voltage jumps to to the level 94 illustrated in FIGURE 4. No further clock pulses can then pass through the voltage comparator and threshold circuit 34 until the voltage of the control signal 90 again exceeds the feedback signal voltage by the threshold value. The positive voltage from the X output terminal of binary $P_1$ is also fed through the lead 76 to the positive control terminal of control circuit A and switches transistors 93 and 95 "on" such that current flows through coil 22 from right to left in what will be termed the positive direction.

As the voltage of the control signal 90 rises to the level 96 so as to exceed the feedback signal voltage, which is at the level 94, by the predetermined threshold value, another clock pulse passes through the positive output 42 and through lead 55 to the AND gates 48–54. Since the X output terminals of the binaries $N_4$, $N_3$, $N_2$, $N_1$ and $P_1$ are already positive, these binaries are not switched. However, since the X output terminal of binary $P_1$ and the positive clock pulse are both applied to AND gate 52, a positive pulse is applied to the X input terminal of binary $P_1$ which is switched such that the X output terminal goes positive. The positive voltage is again added to the feedback signal voltage through resistor 61 to increase the feedback voltage to the level 96. A positive voltage is also applied through lead 77 to the positive terminal of control circuit B thereby switching a positive current through coil 23. Since the X output terminal of binary $P_2$ was zero at the occurrence of the clock pulse at AND gate 53, and the X output terminal of binary $P_3$ is zero, the positive clock pulses are not applied to binary $P_3$ and $P_4$ which are therefore not switched. As the control signal 90 continues to go positive, a clock pulse will be passed through the voltage comparator and threshold circuit 34 at voltage levels 98 and 100 which will successively switch binaries $P_3$ and $P_4$ in the manner previously described, thereby sequentially increasing the feedback signal voltage and sequentially applying positive signals through leads 78 and 79 to switch control circuits C and D on in such manner as to pass positive currents through coils 24 and 25.

When binary $P_4$ was switched, the feedback signal voltage reached the level 100 in FIGURE 4. Then when the voltage of the control signal 90 falls back to level 102 so as to be less than the feedback voltage by the threshold value, a clock pulse is passed through the negative output 44 and is applied to the Y input terminal of binary $P_4$ and to one input terminal of each of the AND gates 64–72. Since the Y output terminal of binary $P_4$ is zero, the binary is switched and the Y output terminal becomes positive and the X output terminal goes to zero. As the X output terminal goes to zero, the feedback voltage is reduced to the level 102 and no further clock pulses pass through the voltage comparator and threshold circuit until the control signal voltage reaches level 104. Further, as the X output terminal of binary $P_4$ goes to zero, the positive voltage is removed from control circuit D and the positive current through coil 25 is switched off. Since all Y output terminals of the binaries are zero, none of the AND gates 66–72 passes the first clock pulse and binaries $P_3$, $P_2$, $P_1$, $N_1$, $N_2$, $N_3$ and $N_4$ are not switched.

As the voltage of the control signal 90 successively falls to levels 104, 106 and 108, clock pulses are passed through the voltage comparator and threshold circuit 34 to the negative output 44, and the positive binaries $P_3$, $P_2$ and $P_1$ are successively switched back to the passive state such that the Y output terminals become positive and the X output terminals become zero. As the X output terminals are successively switched to zero, the feedback signal voltage is reduced along the stepped curve illustrated in dotted line in FIGURE 4, and the positive currents through coils 24, 23 and 22 are successively switched "off." As the voltage of the control signal 90 continues to fall during the negative-going half cycle, clock pulses continue to pass through the negative output 44 of the voltage comparator and threshold circuit 34 each time that the difference between the control signal voltage and feedback signal voltage exceeds the threshold value, and binaries $N_1$, $N_2$, $N_3$ and $N_4$ are successively switched such that the Y output terminals become positive and the X output termials become zero. As the X output terminals become zero, the feedback voltage continues to be reduced along the dotted, stepped curve to the levels 110, 112, 114 and 116. Also, as the Y output terminals of the binaries go positive, positive voltages are applied through leads 84–87 to control circuits A–D and a negative current is switched through the coils 22, 23, 24 and 25.

Then as the voltage of the control signal 90 begins to rise, a clock pulse is again passed through the positive output 42 each time the control signal voltage exceeds the feedback signal voltage by the threshold value. Thus as the control signal reaches the voltage levels 118, 120, 122 and 124, clock pulses are passed through the positive output and binaries $N_4$, $N_3$, $N_2$ and $N_1$ are successively switched such that the X output terminals become positive and the Y outputs become zero, thereby progressively increasing the feedback signal voltage along the dotted curve, and successively switching the negative current through the coils 25, 24, 23 and 22 "off." This sequence of events will be repeated so long as the control signal 90 is applied to the voltage comparator and threshold circuit 34. However, it will be noted that when no control signal is applied to the voltage comparator and threshold circuit 34, the device will automatically assume the passive state because of the balance voltage and no current will pass through any of the coils 22–25.

The energy applied to reciprocate the reaction mass 20 relative to the baseplate 12, and therefore the energy applied to the baseplate 12 and induced in the earth is represented by the stepped curve in FIGURE 5, assuming that the forces contributed by the respective coils 22–25, when energized, are of equal magnitude. Thus as a positive current is passed through the coil 22 as a result of the X output terminal of binary $P_1$ being switched positive, the coil 22 contributes a positive force represented by the rectangle 130. As the X output terminals of the binaries $P_2$, $P_3$ and $P_4$ are successively switched, a positive current is successively applied to the coils 23, 24 and 25, the respective coils contribute forces represented by the rectangles 131, 132 and 133. Then as the X output terminal of the binaries $P_4$, $P_3$, $P_2$, and $P_1$ are successively switched back to zero to turn the currents to the respective coil "off," the forces contributed by the respective coils are successively eliminated. As the Y output terminals of binaries $N_1$, $N_2$, $N_3$ and $N_4$ are successively switched positive, then successively switched back to zero in inverse order, the negative forces represented by the rectangles 134, 135, 136 and 137 are produced by the coils 22–25, respectively. Thus, it will be noted that the total resultant force exerted on the baseplate 12 corresponds closely to the feedback signal voltage applied to the voltage comparator and threshold circuit 34 through the feedback voltage line 40.

It will be appreciated that operation of the control circuit 30 is dependent only upon the voltage level of the control signal 90 and therefore can be made to follow substantially any continuous wave shape of substantially any frequency. However, the rate of switching of the binaries is limited by the frequency of the pulses from the clock circuit 32 as well as the inherent time delays of the circuits. It will also be appreciated that although the threshold circuit 34 will normally be fixed, the final output signal, such as the electromagnetic force can be shaped to a large degree, if desired, by varying the contribution of each of the coils 22–25. For example, this can be accomplished by applying different current levels to the respective coils, by varying the effective turns of the coils, or by a combination of both. It will also be appreciated that any number of coils can be utilized and that, in general, the greater the number of coils, the lower the threshold value, and the greater the frequency of the clock pulses, the more nearly any desired wave shape can be duplicated by the ultimate output signal.

The specific embodiment of the device described above has been illustrated as employing a plurality of electromagnetic coils. However, a single coil may be employed and the voltage outputs from the various binaries used to switch the voltage and therefore the current applied to the single coil to provide the same stepped output curves. Further, the basic control system consisting of the clock 32, the voltage comparator and threshold circuit 34, the balance voltage source 38 and the logic circuit 46 may be utilized to approximately reproduce a control signal in a wide variety of energy forms, rather than the electromagnetic energy and seismic energy forms illustrated.

Having thus described a preferred embodiment of the invention, it is to be understood that various changes, substitutions and alterations can be made therein without departing from the spirit and scope of the invention as defined by the appended claims.

What is claimed is:

1. A system for generating a seismic signal in the earth having a wave shape closely approximating the wave shape of a control signal comprising:

a base plate member for engaging the earth;

a reaction mass member coupled to said baseplate member;

electromagnetic drive means, said drive means having a plurality of coils attached to said reaction mass member such that when energized will reciprocate the mass member relative to the baseplate member;

clock circuit means for generating a sequence of clock pulses;

voltage comparator and threshold circuit means for comparing the voltage level of the control signal with a feedback signal voltage and passing the clock pulses through a positive output when the control signal voltage exceeds the feedback signal voltage by a predetermined threshold value and for passing the clock circuit pulses through a negative output when the feedback voltage exceeds the control signal voltage by a predetermined threshold value;

logic circuit means for successively counting the pulses from the positive and negative outputs and producing a stepped feedback signal to the voltage comparator and threshold circuit which increases a step for each clock pulse counted from the positive output and decreases a step for each clock pulse counted from the negative output, the feedback signal being applied to the voltage comparator and threshold circuit means;

power amplifier means for energizing said coils having positive and negative control terminals connected to each coil for applying a positive or negative current, respectively, to the respective coils; and, output circuit means interconnecting the logic circuit means and the positive and negative controls terminals of the power amplifier means for applying signals to the respective control terminals in synchronism with the steps of the feedback signal so as to produce a total output force from the coils having a stepped wave from synchronized with the feedback signal and approximating the wave form of the control signal.

2. A system for generating a seismic signal in the earth having a wave shape closely approximating the wave shape of a control signal as defined in claim 1 wherein the logic circuit means comprises:

a series of binary circuits each having X inputs and outputs and Y inputs and outputs, the outputs being in opposite voltage states and being switched by a signal applied to the respective input having a state opposite that of the respective output;

X and Y series of AND gates each having two inputs and one output, the X series of AND gates being connected between the X outputs and inputs of successive binary circuits such that the X outputs of the first through the next-to-last binary circuits are connected to one input of an AND gate and the outputs of the respective AND gates are connected to the X inputs of the second through the last binary circuits and, the Y series of AND gates being connected between the Y outputs and inputs of successive binary circuits such that the Y outputs of the last through the second binary circuits are connected to one input of an AND gate and the outputs of the respective Y series AND gates are connected to the Y inputs of the next-to-last through the first binary circuits;

means connecting the positive output of the voltage comparator and threshold circuit to the X input of the first binary circuit and to the other inputs of each of the AND gates of the X series;

means connecting the negative output of the voltage comparator and threshold circuit to the Y input of the last binary circuit and to the other inputs of each of the AND gates of the Y series;

feedback circuit means connecting an output of each of the binary circuit means to the voltage comparator and threshold circuit means for adjusting the level of the feedback signal voltage in accordance with the states of the binary circuits; and wherein, the output circuit means is connected to an output of each binary circuit.

3. A system for generating a seismic signal in the earth having a wave shape closely approximating the wave shape of a control signal as defined in claim 2 wherein each coil has first and second terminals and the power amplifier means connected to each coil is a D.C. to A.C. inverter bridge comprising:

a source of D.C. power having positive and negative terminals;

first switch means connected to the positive terminal of the source and to the first terminal of the coil;

second switch means connected to the negative terminal of the source and to the second terminal of the coil;

third switch means connected to the positive terminal of the source and to the second terminal of the coil;

fourth switch means connected to the negative terminal of the source and to the first terminal of the coil;

positive control terminal means connected to the first and second switch means for turning the switch means "on" and "off" to thereby apply a positive current to the coil; and, negative terminal means connected to the third and fourth switch means for turning the switch means "on" and "off" to thereby apply a negative current to the coil.

4. A system for generating a seismic signal in the earth having a wave shape closely approximating the wave shape of a control signal as defined in claim 3 wherein:

the X outputs of the binaries are interconnected such that the feedback signal voltage is comprised of the sum of the X outputs;

each of the X outputs of the last half of the binaries is connected to a positive control terminal of a power amplifier for one coil;

each of the Y outputs of the first half of the binaries is connected to a negative control terminal of a power amplifier for one coil, and wherein the system is further characterized by means for applying a balance voltage to the voltage comparator and threshold circuit means for counterbalancing the feedback signal voltage from the first half of the binaries, whereby when no control signal is applied to the voltage comparator and threshold circuit means, no clock pulses will be passed through the voltage comparator and threshold circuit and the system will assume a passive state in which the X outputs of the first half of the binaries are positive, the X outputs of the last half of the binaries are zero, and all switch means are "off" so that no current is applied to any coil.

References Cited by the Examiner
UNITED STATES PATENTS

| | | | |
|---|---|---|---|
| 1,050,960 | 1/1913 | Lincoln | 310—35 |
| 2,970,570 | 2/1961 | Hill. | |
| 3,122,664 | 2/1964 | Loeb | 181—0.5 X |
| 3,143,181 | 8/1964 | Bays et al. | 181—0.5 |
| 3,208,545 | 9/1965 | Doty et al. | 181—0.5 |

SAMUEL FEINBERG, *Primary Examiner.*

BENJAMIN A. BORCHELT, *Examiner.*

M. F. HUBLER, *Assistant Examiner.*